Jan. 6, 1970 J. A. VALLÉE 3,488,662

BINARY MAGNETIC RECORDING WITH INFORMATION-DETERMINED COMPENSATION FOR CROWDING EFFECT

Filed Nov. 14, 1966 2 Sheets-Sheet 1

INVENTOR.
JOHNNY A. VALLÉE
BY
Carl V. Olson
Attorney

Jan. 6, 1970 J. A. VALLÉE 3,488,662

BINARY MAGNETIC RECORDING WITH INFORMATION-DETERMINED COMPENSATION FOR CROWDING EFFECT

Filed Nov. 14, 1966 2 Sheets-Sheet 2

INVENTOR.
JOHNNY A. VALLÉE
BY
Carl V. Olson
Attorney 3,488,662
BINARY MAGNETIC RECORDING WITH INFORMATION-DETERMINED COMPENSATION FOR CROWDING EFFECT

Johnny A. Vallée, Juno Beach, Fla., assignor to RCA Corporation, a corporation of Delaware Filed Nov. 14, 1966, Ser. No. 594,062
Int. Cl. G01d *15/12*
U.S. Cl. 346—74 3 Claims

ABSTRACT OF THE DISCLOSURE

In a high-density magnetic recording of binary information in which a transition occurs in the middle of a bit cell containing a "1" and between consecutive bit cells containing "0's," the second of the two closely-spaced transitions produces a crowding or overlapping effect on the first transition, which makes the first transition appear to be shifted earlier in time when reading back the information. This is compensated for by delaying the recording of each transition representing the center of a bit cell containing a "1" which is followed by a "1," or representing the partition between bit cells containing two "0's" which are followed by a third "0."

Figure 1:
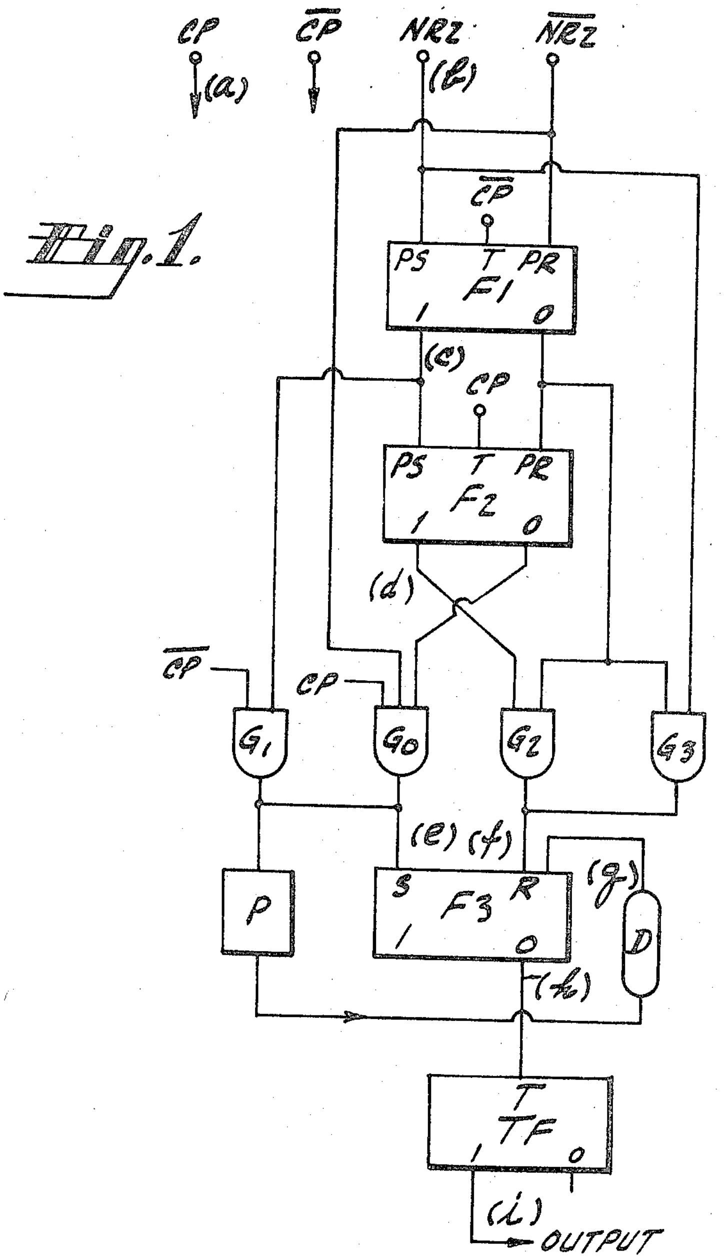

This invention relates to high density magnetic recording of binary signals. The invention is particularly useful in self-locking recording systems of the so-called delay modulation type in which magneitc transitions are recorded within bit cells representing "1's," and magnetic transitions are recorded so partitions between bit cells representing consecutive "0's."

Binary information in a computer or data processor is normally contained in registers. When a sequence of binary information bits are to be transferred from the computer to a magnetic recording medium, the information is normally shifted out of a shift register under the control of shift or clock pulses. The serial information obtained from the shift register is in a non-return-to-zero (NRZ) code in which "1's" are represented by a high signal level and "0's" are represented by a low signal level. If this information is to be recorded on a magnetic medium, it is necessary to also record clocking information for identifying the time of occurrence of the bit cells. To avoid the use of a second recorded timing track, the NRZ information signal is usually converted to a self-clocking information signal containing timing information which can be extracted when the recorded information is reproduced. A particularly useful self-clocking code is known as a delay modulation code in which signal transitions occur within bit cells represents "1's," and signal transitions occur at the boundaries between bit cells representing consecutive "0's." This self-clocking code contains relatively few signal transitions and permits a relatively high density of binary information to be recorded of a magnetic medium.

As attempts are made to record binary information with ever increasing density on a magnetic medium, it is found that closely-spaced recorded transitions partially overlap each other with a resulting reduction in the reliability with which the closely-spaced transitions can be correctly reproduced when the information is read from the magnetic medium. This overlapping or crowding effect of closely-spaced recorded transitions is most severe with certain sequences of digital information bits.

It is a general object of the invention to provide means for recording binary information in such a way as to compensate in advance for the effect of the crowding and overlapping of the most closely-spaced of the recorded transitions.

It is a specific object to provide a means for magnetically recording binary information in the delay modulation code in a way which improves the reliability of reproducing closely-spaced recorded transitions representing two or more consecutive "1's" and closely-spaced transitions representing three or more consecutive "0's."

In accordance with an example of the invention, there is provided an encoder for translating non-return-to-zero coded information wave and an accompanying clock wave to a self-clocking recording wave in a delayed modulation code in which transitions are recorded within bit cells representing "1's" and transitions are recorded between bit cells representing consecutive "0's." The encoder inincludes means to delay transitions in the output recording wave by either one or the other of two amounts. The transitions are normally delayed the smaller of the two amounts. A transition is delayed the larger of the two amounts if the transition represents a "1" which is immediately followed by another "1." A transition is also delayed the larger amount if the transition represents a partition between two bit cells containing "0's" and the two "0's" are immediately followed by a third "0."

Figure 2:
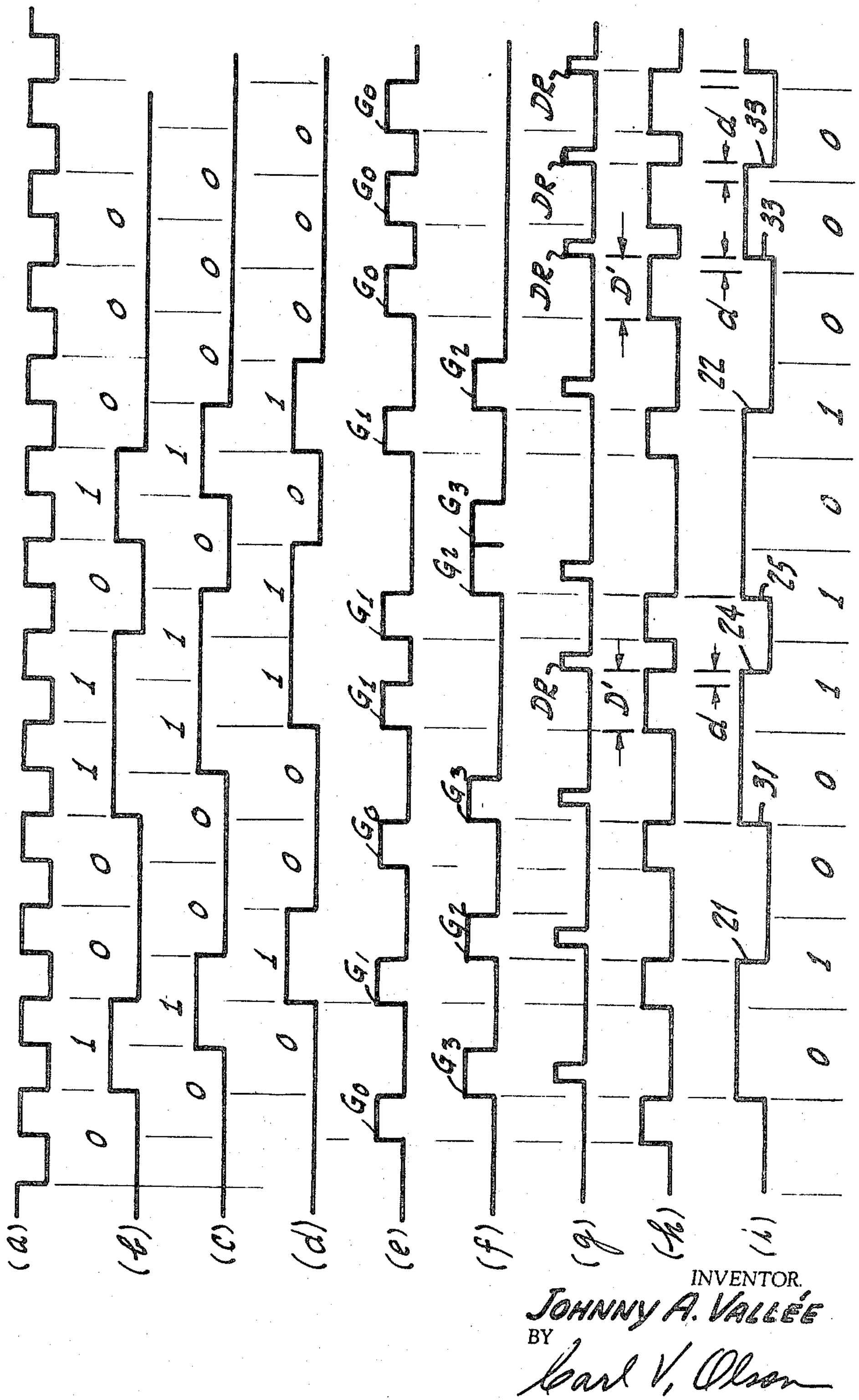

In the drawing:

FIG. 1 is a block diagram of an encoder constructed according to the teaching of the invention; and FIG. 2 is a chart of voltage waveforms that will be refererd to in describing the operation of the encoder of FIG. 1.

The encoder of FIG. 1 includes clock pulse input terminals CP and $\overline{CP}$. The clock pulse wave supplied to the terminal CP may be shown by the wave of FIG. 2*a*. The wave at the terminal $\overline{CP}$ is the inverse or the inverted version of the wave of FIG. 2*a*. Binary information signal input terminals NRZ and $\overline{NRZ}$ are provided for an input NRZ signal and its complement. The NRZ signal may be shown by FIG. 2*b*. The input terminals NRZ and $\overline{NRZ}$ are connected to respective prime set PS and prime reset terminals of a first flip-flop F1. The flip-flop F1 also has a trigger input T connected over a line (not shown) to the inverted clock pulse terminal $\overline{CP}$. Flip-flop F1 (and flip-flop F2) is constructed in conventional manner to provide a mode of operation in which the flip-flop cannot be set or reset unless or until a trigger signal is present on the trigger input T of the flip-flop.

The 1 and 0 outputs of flip-flop F1 are connected resectively to prime set PS and prime reset PR inputs of a second flip-flop F2. The trigger input of flip-flop F2 is connected to the clock pulse terminal CP. The 1 output of flip-flop F2 is connected through an "and" gate $G_2$ to the reset input R of third flip-flop F3. The 0 output of flip-flop F2 is connected through an "and" gate $G_0$ to the set input S of third flip-flop F3. The gate $G_2$ also has an input connected from the 0 output of flip-flop F1. The gate $G_0$ also has an input connected from the signal input terminal $\overline{NRZ}$ and an input connected to the clock pulse input terminal CP.

An "and" gate $G_1$ has an input connected from the 1 output of flip-flop F1 and an input connected from the clock pulse terminal $\overline{CP}$. Gate $G_1$ has an output connected to the set input S of flip-flop F3. An "and" gate $G_3$ has an input connected from the 0 output of flip-flop F1 and has an input connected from the input signal terminal NRZ. Gate $G_3$ has an output connected to the reset input R of flip-flop F3.

The outputs of gates $G_0$ and $G_1$ are also connected through a pulse slimmer P, which may be a conventional monostable or trigger circuit, and thence through a delay device D to the reset input R of the flip-flop F3. The 0 output of flip-flop F3 is connected to the trigger input T of a triggerable flip-flop TF. The 1 output of triggerable flip-flop TF provides an output delay modulation signal for recording on a magnetic medium.

The operation of the encoder of FIG. 1 will now be described with references to the waveforms shown in FIG. 2. The input clock pulse wave and the input NRZ information wave have a relative phase relationship as shown by FIGS. 2*a* and 2*b*. It is seen that a complete cycle of the clock pulse wave corresponds in time with one bit cell of the information wave. The NRZ information signal is applied to the flip-flop F1, and the flip-flop F1 responds to and receives the information signal at the beginnings of the negative excursions of the clock pulse wave CP (positive excursions of wave CP shown in FIG. 2*a*) applied to the trigger input T of the flip-flop. The phase relationships are such that the output of the flip-flop F1 as shown in FIG. 2*c* is the same as the input to flip-flop F1 but is delayed in time an amount equal to one-half of a bit period.

The output of flip-flop F1 is in turn applied to the input of flip-flop F2 under the control of negative excursions of the clock pulse CP of FIG. 2*a*. Therefore, the output of flip-flop F2 is a similar information wave as shown in FIG. 2*c* but is delayed an additional amount equal to one-half of a bit cell period. The flip-flops F1 and F2 operate to make the input information wave of FIG. 2*b* available in the successively delayed forms shown in FIGS. 2*c* and 2*d*.

By having available the three successively delayed versions of the input NRZ wave, together with the clock pulse wave, comparisons can be made to determine whether the information in an input bit cell is a "1" or a "0" and whether an input bit cell containing a "0" is immediately followed by another "0." Also, the comparisons can be made at times selected to generate an output transition representing a "1" at the middle of an output wave bit cell, and to generate an output transition representing two successive "0's" at the boundary between the two output wave bit cells.

Gate $G_1$ is enabled to set the third flpi-flop F3 at the end of every input signal bit cell (FIG. 2*b*) representing a "1." Gate $G_1$ passes a pulse whenever the 1 output (FIG. 2*c*) of flip-flop F1 is high and the clock pulse wave (FIG. 1*a*) is low. The times when gate $G_1$ is enabled to set flip-flop F3 are determined by the leading edges of the pulses labeled $G_1$ in the wave of FIG. 2*e*.

Gate $G_0$ is enabled to set flip-flop F3 at the middle of the second of two successive input signal bit cells (FIG. 2*b*) containing "0's." Gate $G_0$ passes a pulse whenever input wave (FIG. 2*b*) is low, the twice-delayed input wave (FIG. 2*d*) is low and the clock pulse wave (FIG. 2*a*) is high. The times when gate $G_0$ is enabled to set flip-flop F3 are determined by the leading edges of the pulses labeled $G_0$ in the wave of FIG. 2*e*.

Every time the third flip-flop F3 is set by an output from gate $G_0$ or gate $G_1$, the output from gate $G_0$ or gate $G_1$ is applied through a pulse slimmer P and thence through a delay device D to the reset input R of the flip-flop. After flip-flop F3 has been set, it is always reset after a time determined by delay unit D, unless it is reset at an earlier time by a signal from gate $G_2$ or gate $G_3$. The pulse slimmer P insures that the pulse applied to the reset input R of flip-flop F3 will not have a time duration extending to the next time that the flip-flop is set.

The pulse wave of FIG. 2*e* from gates $G_1$ and $G_0$ (used to set flip-flop F3) is suitable for application directly to the trigger input of triggerable flip-flop TF to produce therefrom an output delay modulation signal in which there is a transition at the middle of each bit cell representing a "1," and a transition between bit cells representing consecutive "0's." However, the flip-flop F3 is interposed for the purpose of controllably delaying the trigger applied to triggerable flip-flop TF. The trigger output from flip-flop F3 occurs when flip-flop F3 is reset. Flip-flop F3 is reset at a time following its being set which is determined by the information bit sequence. Flip-flop F3 is normally reset at a given time following its being set, and is reset at a slightly later time following its being set if the information bit sequence consists of a "1" followed by a "1," or consists of two "0's" followed by a third "0." The normal, earlier resetting of flip-flop F3 is controlled by gates $G_2$ and $G_3$. The later resetting of flip-flop F3 is controlled by delay unit D.

Gate $G_2$ is enabled to reset flip-flop F3 whenever the input information signal consists of a "1" followed by a "0" (i.e., *not* followed by a "1"). Gate $G_2$ passes a pulse whenever the information wave of FIG. 2*c* is low and the information wave of FIG. 2*d* is high. The reset pulses applied to flip-flop F3 from gate $G_2$ are identified as pulses $G_2$ in the wave of FIG. 2*f*.

Gate $G_3$ is enabled to reset flip-flop F3 whenever the input signal wave includes two "0's" followed by a "1." (i.e., *not* followed by a third "0"). Gate $G_3$ passes a pulse whenever the information wave of FIG. 2*b* is high, and the information wave of FIG. 2*c* is low. The times when gate $G_3$ is enabled are determined by the leading edges of the pulses labeled $G_3$ in the waveform of FIG. 2*f*. Whenever gate $G_2$ or gate $G_3$ is enabled, it resets flip-flop F3 before the flip-flop is reset by a signal (FIG. 2*g*) from the delay unit D. Alternative constructions will be apparent to those skilled in the art such as one in which the gates $G_2$ and $G_3$ have inputs connected to respond to "11" and "000" sequences, and the output of delay unit D causes an earlier resetting of flip-flop F3.

The 0 output (FIG. 2*h*) of flip-flop F3 is applied to the trigger input T of triggerable flip-flop TF to cause triggerable flip-flop TF to change its state every time flip-flop F3 is reset. The 1 output (FIG. 2*i*) of flip-flop TF is a delay modulation recording signal in which a transition within a bit cell represents a "1" and in which a transition near the boundary between bit cells represents two consecutive "0's."

An output transition within a bit cell representing a "1" occurs in the center or middle of the bit cell if the "1" is followed by a "0." Such transitions are shown at 21 and 22 in FIG. 2*i* and result from the action of gate $G_2$. An output transition within a bit cell representing a "1" occurs at a time *d* delayed from the center or the middle of the bit cell if the "1" is followed by a "1." Such a transition is shown at 24 in FIG. 2*i* and it results from the absence of an output from gate $G_1$ and the presence of a pulse DR (FIG. 2*g*) from delay unit D. A pulse DR always occurs at a time D′ (FIG. 2*h*) following the setting of flip-flop F3. The delay *d* is a small fraction, in the range of from one-tenth to one-third of the period of a bit cell or the time between most-closely-spaced transitions.

An output transition near the boundary between bit cells representing two consecutive "0's" occurs at the partitioning boundary if the two "0's" are followed by a "1." Such a transition is shown at 31 in FIG. 2*i* and results from the action of gate $G_3$. An output transition near the boundary between bit cells representing two consecutive "0's" occurs at a time *d* delayed from the partitioning boundary if the two "0's" are followed by a third "0." Such transitions are shown at 33 in FIG. 2*i* and result from the absence of an output from gate $G_3$ and the presence of a pulse DR (FIG. 2*g*) from delay unit D.

The delay modulation output signal of FIG. 2*i* is characterized in having most-closely-spaced transitions whenever the information bit sequence consists of consecutive "1's" or consecutive "0's." The transition at 25 representing a second "1," when recorded on a magnetic medium, produces an effect which extends to and partially overlaps the recorded transition of the preceding or first "1." Therefore, when reading back the recorded information, the first recorded "1" appears earlier in time than it should as the result of having been crowded to the left by the second recorded "1." The crowding of the first "1" may prevent its being correctly reproduced.

According to the invention, the crowding effect on the first "1" due to the following "1" is compensated for in advance by delaying the transition 24 corresponding to the first "1" an amount *d* from the center of the bit cell. The crowding effect of the later transition 25 causes the transition at 24 to be effectively "pushed back" to the center of its bit cell. In this way the crowding effect is compensated for during recording and the information is correctly reproduced when the magnetic medium is traversed by a reading head. The crowding effect of consecutive "0's" is similarly overcome by delaying a transition 33 (FIG. 2*i*) between bit cells containing two "0's" solely when they are followed by a third "0."

It will be understood that the assignment herein of "1" and "0" meanings to different signal transitions is purely arbitrary and may be reversed. Similarly, the identification of flip-flop terminals as PS, PR, S, R, 1 and 0 is arbitrary and for clarity of explanation.

What is claimed is:

1. In a magnetic recording system of the type in which transitions are recorded in the middle of bit cells representing "1's," and are recorded as partitions between bit cells representing consecutive "0's," the combination of means to introduce a delay of a fraction of a bit cell in recording a transition representing a "1" solely when the "1" is to be immediately followed by another "1," and means to introduce a delay of a fraction of a bit cell in recording a transition representing a partition between two bit cells containing "0's" solely when the two "0's" are to be immediately followed by a third "0."

2. In a magnetic recording system of the type in which transitions are recorded within bit cells representing "1's," and are recorded as partitions between bit cells representing consecutive "0's," the combination of a bistable flip-flop having a set input receptive to signal transitions representing "1's" and to signal transitions representing partitions between successive "0's,"

detector means to distinguish on the one hand, signal transitions representing a "1" followed by a "1" and two "0's" followed by a "0," and, on the other hand, signal transitions representing a "1" followed by a "0" and two "0's" followed by a "1,"

means under control of said detector means to reset said flip-flop at one or the other of two time periods following each setting of the flip-flop, and a triggerable flip-flop having a trigger input coupled to the reset-indicating output of said bistable flip-flop whereby an output of said triggerable flip-flop is a modified information signal suitable for high-density recording on a magnetic medium.

3. In a magnetic recording system of the type in which transitions are recorded within bit cells representing "1's," and are recorded as partitions between bit cells representing consecutive "0's," the combination of a bistable flip-flop having a set input receptive to signal transitions representing "1's" and to signal transitions representing partitions between successive "0's,"

a delay device coupled from the set input of said flip-flop to a reset input of the flip-flop.

means to recognize a transition representing a "1" which is immediately followed by a "0" and to reset said bistable flip-flop a fraction of a bit cell time prior to the reset pulse from said delay device, a means to recognize a transition representing a partition between two successive "0's" immediately followed by a "1" and to reset said bistable flip-flop a fraction of a bit cell time prior to the reset pulse from said delay device, a triggerable flip-flop having a trigger input coupled to the reset-indicating output of said bistable flip-flop, and means utilizing an output of said triggerable flip-flop to record signal transitions on a magnetic medium.

References Cited

UNITED STATES PATENTS

| | | | |
|---|---|---|---|
| 3,067,422 | 12/1962 | Hunt | 346—74 |
| 3,235,855 | 2/1966 | Way Dong Woo | 364—74 |
| 3,345,638 | 10/1967 | Christol | 346—74 |
| 3,377,583 | 4/1968 | Sims | 340—174.1 |

BERNARD KONICK, Primary Examiner

R. F. CARDILLO, Jr., Assistant Examiner

U.S. Cl. X.R.

340—174.1

PO-1050
(5/69)

UNITED STATES PATENT OFFICE
CERTIFICATE OF CORRECTION

Patent No. 3,488,662 Dated January 6, 1970

Inventor(s) Johnny A. Vallée

It is certified that error appears in the above-identified patent and that said Letters Patent are hereby corrected as shown below:

Column 1 line 29 change "self-locking" to ---self-clocking--

Column 2 line 38 after "prime reset" insert ---PR---.
line 48 after "input" insert ---T---.

Column 3 line 13 change "CP" (first occurrence) to ---$\overline{CP}$---.

SIGNED AND
SEALED
JUL 7 1970

(SEAL)
Attest:

Edward M. Fletcher, Jr.
Attesting Officer

WILLIAM E. SCHUYLER, JR.
Commissioner of Patents